United States Patent [19]

Oakley et al.

[11] 3,959,147
[45] May 25, 1976

[54] FILTER ELEMENT ASSEMBLY

[75] Inventors: Harold C. Oakley, Lebanon; James R. Sypitkowski, Indianapolis, both of Ind.

[73] Assignee: The Carborundum Company, Niagara Falls, N.Y.

[22] Filed: May 2, 1974

[21] Appl. No.: 466,366

Related U.S. Application Data

[63] Continuation of Ser. No. 359,384, May 11, 1973, abandoned, which is a continuation of Ser. No. 146,950, May 26, 1971, abandoned.

[52] U.S. Cl. .............. 210/323 T; 210/450; 210/451; 210/457
[51] Int. Cl.² .......................................... B01D 23/00
[58] Field of Search ............ 55/350, 482, 484, 498, 55/502, 510; 210/232, 236, 253, 261, 282, 314, 316, 340, 437, 446, 447, 449, 457, 459, 460, 463, 488, 493, 494, 497, 323, 450, 451

[56] References Cited
UNITED STATES PATENTS

| 2,294,330 | 8/1942 | Clark | 210/335 |
| 2,966,269 | 12/1960 | Allen | 210/335 |
| 3,064,819 | 11/1962 | Jones | 210/282 |
| 3,160,588 | 12/1964 | Alanie | 210/488 |
| 3,406,831 | 10/1968 | Bush et al. | 210/489 |
| 3,476,252 | 11/1969 | Kudlaty | 210/234 |
| 3,516,549 | 6/1970 | MacDonnell | 210/493 |
| 3,586,171 | 6/1971 | Offer | 210/314 |
| 3,592,766 | 7/1971 | Kudlaty | 210/493 |

FOREIGN PATENTS OR APPLICATIONS

| 1,071,671 | 12/1959 | Germany | 210/232 |
| 990,136 | 9/1951 | France | 55/490 |

*Primary Examiner*—Charles N. Hart
*Assistant Examiner*—Ernest G. Therkorn
*Attorney, Agent, or Firm*—David E. Dougherty; Robert C. Weber; William H. Holt

[57] ABSTRACT

An improved filter cartridge, having a central opening throughout and having sealing means at the bottom of the cartridge for sealing around an inserted filtrate conduit. The upper part of the cartridge has a slightly tapered neck adapted for insertion in the bottom of a second filter cartridge, the cartridges assembled in a stacked relationship within the filter housing.

7 Claims, 4 Drawing Figures

FILTER ELEMENT ASSEMBLY

CROSS REFERENCES TO RELATED APPLICATIONS

This application is a continuation of copending application Ser. No. 359,384, filed May 11, 1973 which is a continuation of copending application Ser. No. 146,950, filed May 26, 1971 and both now abandoned.

BACKGROUND OF THE INVENTION

Filtration is an operation common to many types of industrial processes. While the basic principles are simple, many different types of filtration equipment have been designed for specific applications. In many cases, compromises must be made between filter size, filtration efficiency, and ease of cleaning. Some filters are capable of regenerating their filter media periodically, most however, especially in smaller filters, depend on periodic replacement of filter elements. Cartridge filters are common examples of this type and their design places emphasis on the use of filter cartridges that can be easily discarded and replaced without undue loss of time and filter efficiency. One disadvantage has been the difficulty of installing a replacement cartridge in proper position to avoid leakage when filtration is resumed. This can be a source of trouble, especially when large numbers of cartridges are changed or installation time is limited. The filter cartridge of this invention has therefore been designed to allow rapid installation while at the same time supplying an improved means of sealing the cartridge in place and retaining the seal, even though the cartridge may undergo slight movements during filter operation.

SUMMARY OF THE INVENTION

The invention provides a filter cartridge and a filter assembly, with the latter comprising a housing having a suitable inlet and outlet, the lower outlet tube having an internal extension so shaped to guide the placement thereon of the lower opening of a filter cartridge. The lower opening of the cartridge is provided with a sealing means held by a suitable retainer which gives a fluid tight seal against the outlet tube. The upper end cap has a neck forming an opening for the flow of filtered fluid. This opening is capped if a single cartridge is used. In a stacked assembly of two or more cartridges, the neck opening fits into the bottom opening of a second filter cartridge. The construction of the invention provides a floating type of seal which functions to allow a limited movement of the filter cartridges during filtration and permits rapid replacement of cartridges when required.

Accordingly, one primary object of the present invention is to provide a filter cartridge, wherein the improvement comprises: an annular filter element; one end cap closing one end of the element; another annular end cap closing the other end of the element and having an axially inwardly offset inner peripheral portion, a substantially flat retaining ring forming with the inner peripheral portion an inwardly open annular channel, and annular elastic sealing means arranged in the channel.

One secondary object is to provide such filter cartridge wherein such one end cap has an axially outwardly extending central tubular neck adapted to be inserted through and compress the sealing means of another filter cartridge corresponding to such sealing means to form a fluid tight seal therewith.

One tertiary object is to provide such filter cartridge wherein such neck is closed by a cap having an annular axial flange provided with an inwardly open annular recess, and annular elastic sealing means arranged in such recess and compressed by such neck to form a fluid tight seal therwith.

Another primary object is to provide a filter assembly including, in combination, a housing having an inlet for fluid to be filtered and an outlet for discharging filtered fluid from the housing; and at least one filter cartridge arranged in the housing, wherein the improvement comprises: the cartridge including an annular filter element; one end cap closing one end of the element; another annular end cap closing the other end of the element and having an axially inwardly offset inner peripheral portion, a substantially flat retaining ring forming with the inner peripheral portion an inwardly open channel, and annular elastic sealing means arranged in the channel; the one end cap being closed to one of the inlet and outlet; and the other of the inlet and outlet including a tubular extension projecting axially inwardly through and compressing the sealing means to form a fluid tight seal therewith.

Another secondary object is to provide such filter assembly wherein such one end cap has an axially outwardly extending central tubular neck closed by a cap having an annular axial flange provided with an inwardly open annular recess, and annular elastic sealing means arranged in such recess and compressed by such neck to form a fluid tight seal therewith.

A further primary object is to provide a filter assembly including, in combination, a housing having an inlet for fluid to be filtered and an outlet for discharging filtered fluid from the housing; and at least two filter cartridges arranged in stacked relationship in the housing, wherein the improvement comprises: each of the cartridges including an annular filter element; one end cap closing one end of the element; another annular end cap closing the other end of the element, and having an axially inwardly offset inner peripheral portion, a substantially flat retaining ring forming with the inner peripheral portion an inwardly open annular channel, and annular elastic sealing means arranged in the channel; the one end cap of one of the cartridges having an axially outwardly extending central tubular neck inserted through and compressing the sealing means of the other of the cartridges to form a fluid tight seal therewith; the one end cap of the other cartridge being closed to one of the inlet and outlet; and the other of the inlet and outlet including a tubular extension projecting axially inwardly through and cmpressing the sealing means of the one cartridge to form a fluid tight seal therewith.

A further secondary object is to provide such filter assembly wherein the one end cap of each of the cartridges has such neck, with such neck of the one end cap of the other cartridge being closed by a cap having an annular axial flange provided with an inwardly open annular recess, and annular elastic sealing means arranged in such recess and compressed by such neck of such one end cap of the other cartridge to form a fluid tight seal therewith.

DESCRIPTION OF THE INVENTION

Figure 1:
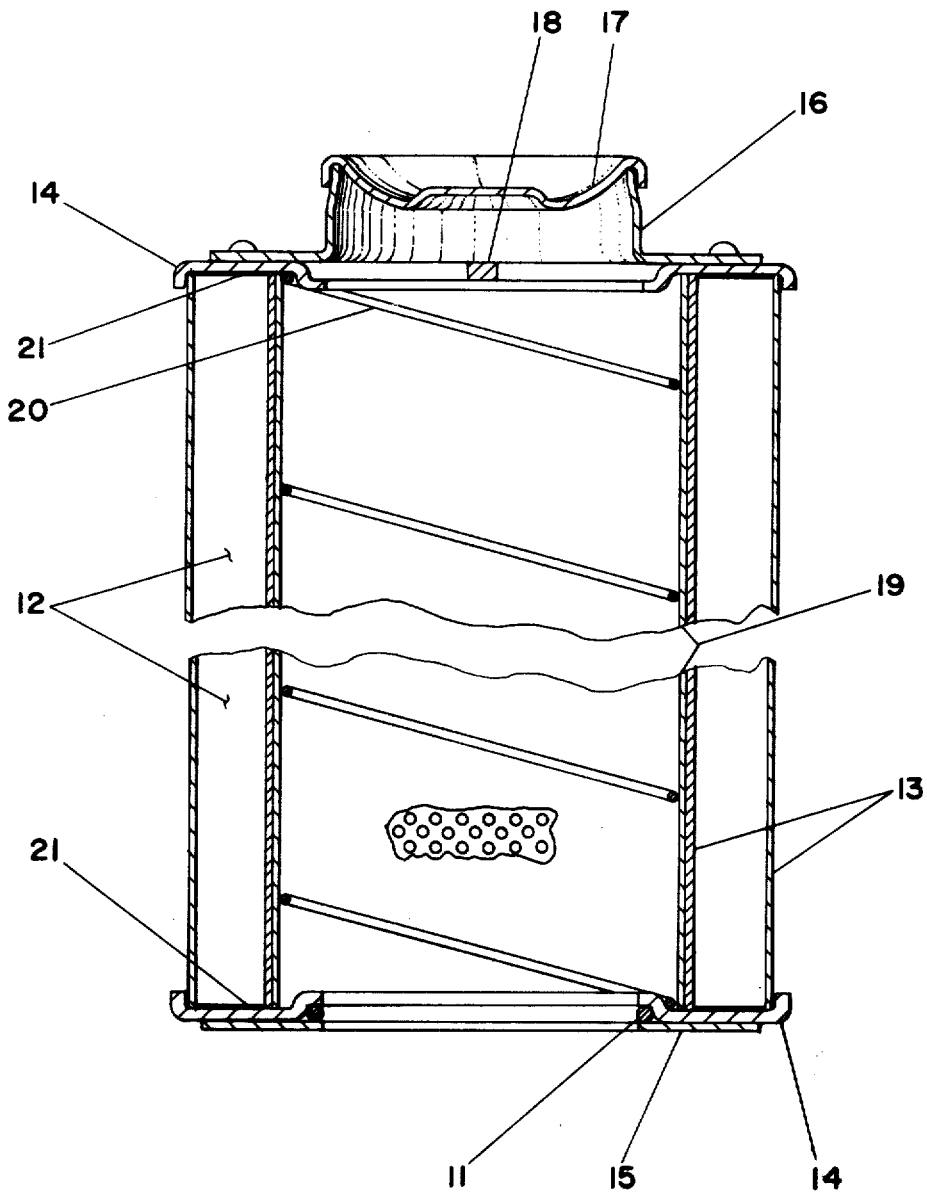
FIG. 1 shows a filter cartridge.

A filter cartridge with the improved sealing means of the invention is shown in FIG. 1. The filter cartridge includes an annular filter element 12. The element 12 may be a pleated material or may comprise layers of fibrous material or combinations thereof with the pleated material. The filter element is enclosed and supported by external and internal screens 13. The internal screen 13 is supported by spring 20. The ends of the cartridge are sealed by metal end caps 14, the filter screens and elements 12 being sealed to the end caps with a suitable sealant such as epoxy cement 21. Construction of the element permits the use of single or multiple layers of paper, synthetic, natural fiber or metallic mesh filter media. A lift bar 18 or rod 23 (see FIG. 2) may be included for ease of cartridge replacement.

Figure 2:
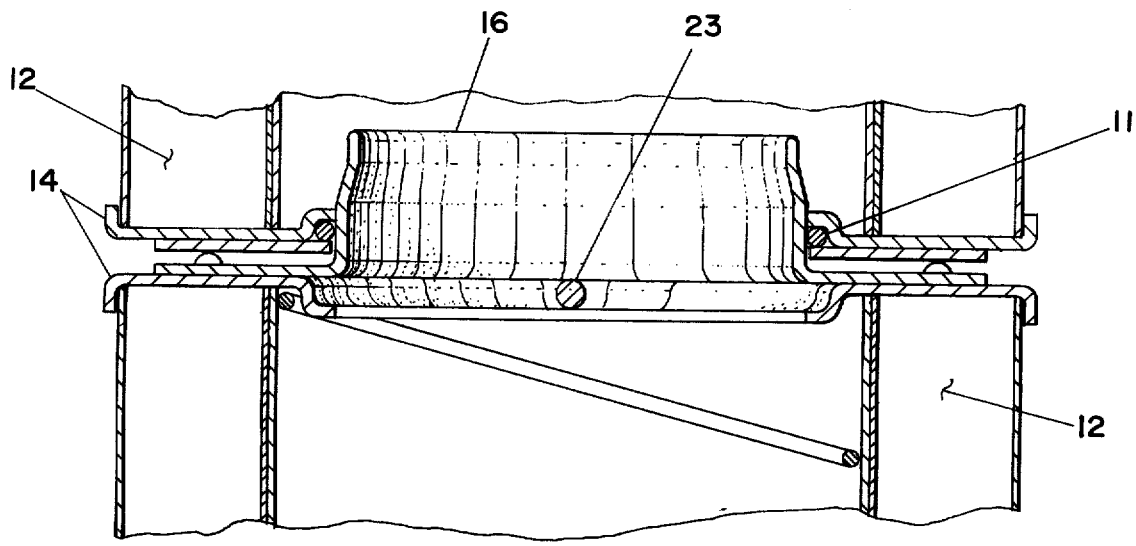
FIG. 2 illustrates the method of sealing between cartridges.
Figure 4:
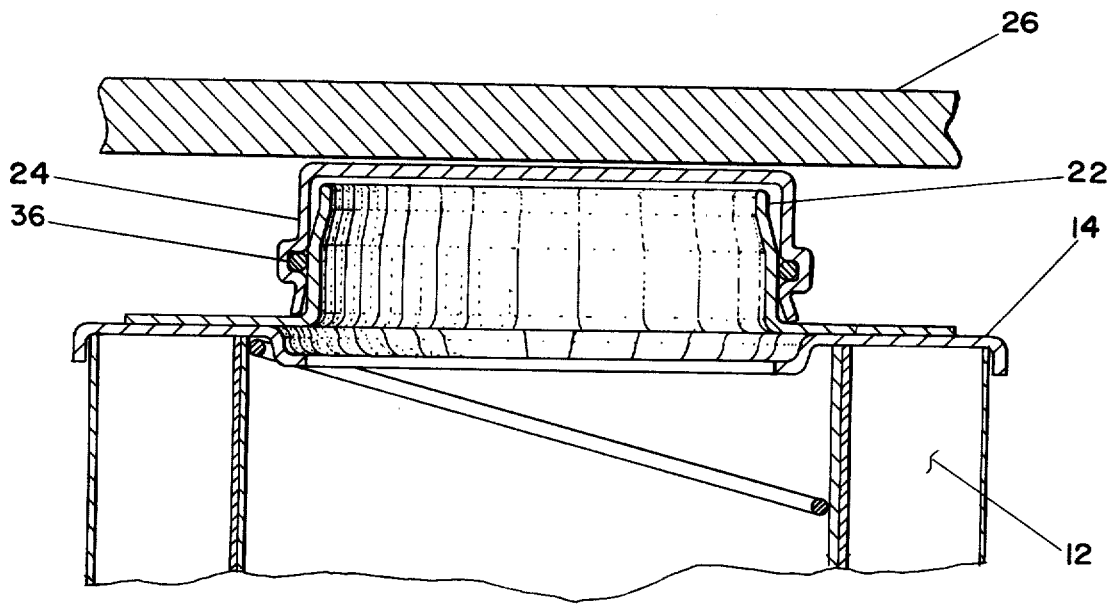
FIG. 4 shows an alternate means of filter housing closure without spring loading.
Figure 3:
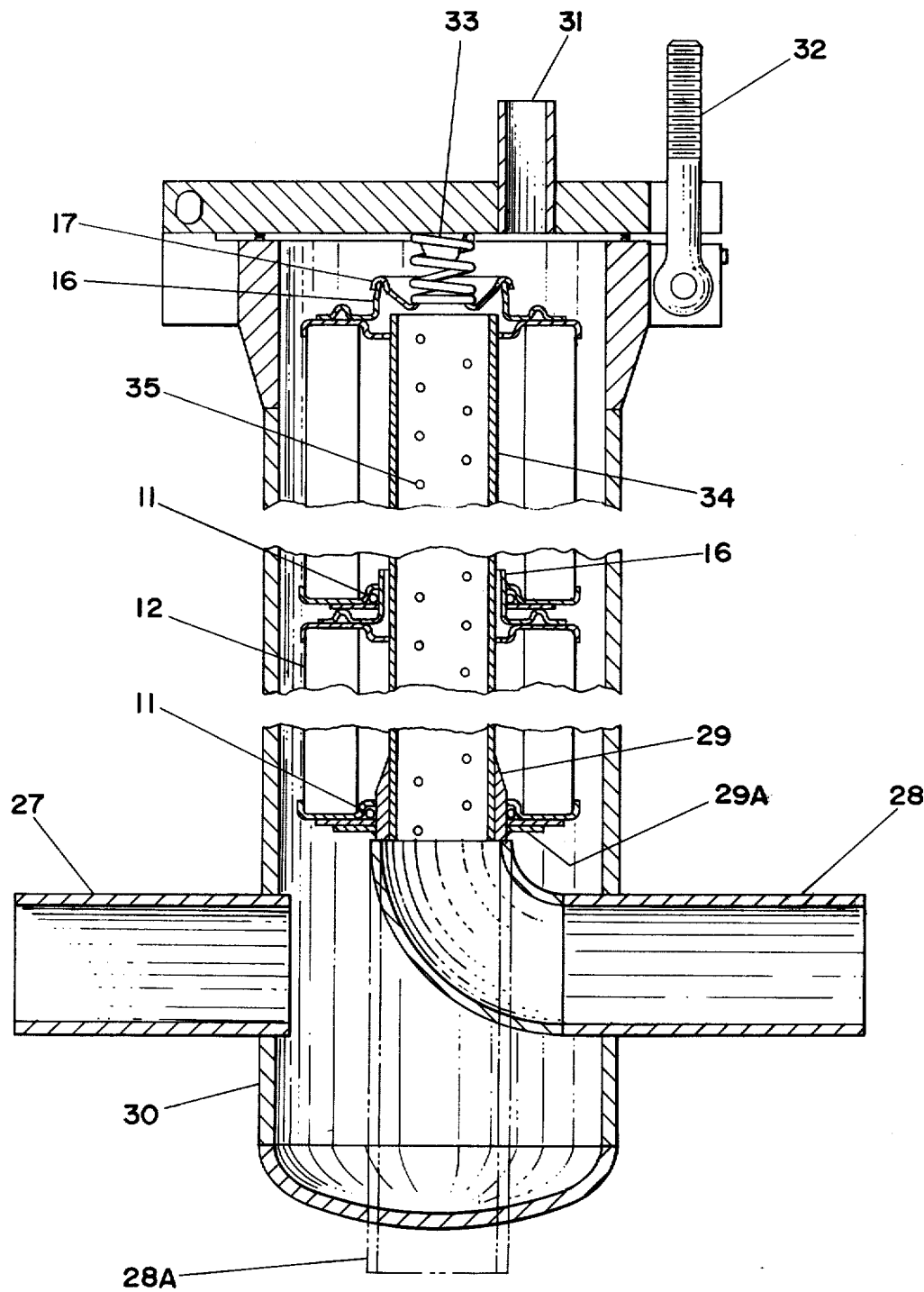
FIG. 3 shows the complete filter assembly with two cartridges and internal center support.

The bottom end cap contains a sealing means 11 of circular shape such as an elastomer O-ring which may be of rubber, either natural or synthetic and which is held in place by a metal retaining ring 15. The top of the cartridge has an end cap having a neck 16 which extends sufficiently to provide sealing engagement with the lower opening of a second filter cartridge as shown in FIG. 2. The neck has a slight inward slope or taper so as to form a fluid-tight seal by compressing the sealing means when inserted therethrough. It is contemplated that various end caps are within the scope of the present invention. The type of neck having the long extension 16 is for a spring loaded filter assembly as shown in FIG. 3. For this a cap 17 is employed to close the upper end of the filter cartridge, using a snap fit to seal the neck 16. A preferred type of neck 22, as shown in FIG. 4, has a somewhat shorter neck extension and is sealed by a cap 24 which contains an O-ring 34. The cap is held in place on the filter assembly by the filter housing top plate 26.

A complete filter assembly is shown in FIG. 3 in which two filter elements are shown in stacked relationship within a filter housing 30. The housing comprises an inlet pipe 27, an outlet pipe 28, and a hinged housing top plate 26, the plate having a vent tube 31 and the housing a hold down bolt 32. The outlet pipe 28 has a short tapered extension 29 over which the lower end of the lower filter cartridge is placed and which provides a tight seal with the sealing means 11. The lower filter cartridge is supported by the stop plate 29A which is firmly attached to the outlet tube. The neck 16 of the end cap on the upper end of the cartridge provides a corresponding sealing surface for the sealing means 11 of the top filter cartridge. The complete assembly is held in place by the head spring 33 coacting with the housing top plate 26. An alternate outlet pipe position is shown at 28A.

While the stacked assembly as described is suitable for most applications, a cartridge center support may be needed in cases where the filter is subject to vibration or tipping from the vertical position. The assembly in FIG. 3 is therefore shown with a tubular center support 36, attached to the outlet tube 28 and extending vertically through the open centers of the filter cartridges. The tube ends just below neck 16 of the end cap of the upper filter cartridge, the tube being perforated with numerous openings 35 to permit filtrate drainage. The center support ensures proper cartridge alignment, especially with several stacked elements. This type of filter assembly also may be adapted to permit replacement of filter cartridges by remote control handling, especially in applications where the liquid may be radioactive or hazardous in other respects.

During normal operation, the contaminated liquid to be filtered is admitted to the filter housing through inlet pipe 27. Vent 31 is closed when the housing is filled. The liquid passes through the cartridge elements 12 and filtrate collects in the center channel of the cartridges and is then discharged through the outlet pipe 28. While the filter is operated preferably with liquid flowing from the exterior of the cartridges into their interior channels, the flow may be reversed, either momentarily for back flushing or as a continuous reverse flow.

Although a filter assembly of two cartridges has been described and shown in FIG. 3, the invention is not limited to this but may be employed as well for assemblies having more than two cartridges in stacked relationship. If overall height is limited, an assembly having a single filter cartridge may be used, the cartridge being closed at the upper end by an end cap such as shown in FIG. 1 or FIG. 4 and sealing at the lower end as previously described.

A preferred embodiment of the invention is shown in FIG. 4 in which the head spring 33 of FIG. 3 is eliminated and the housing top plate 26 lowered sufficiently to hold the cap 24 in place when the housing top place is closed. In this embodiment, the seals 36 and 11 (see FIGS. 2 or 3) compensate for small changes in manufacturing tolerances in both filter housings while still maintaining efficient sealing action.

What is claimed is:

1. A filter cartridge, wherein the improvement comprises: an annular filter element; one end cap closing one end of said element; another annular end cap closing the other end of said element and having an axially inwardly offset inner peripheral portion, a substantially flat retaining ring forming with said inner peripheral portion an inwardly open annular channel, and annular elastic sealing means arranged in said channel.

2. The filter cartridge of claim 1 wherein said one end cap has an axially outwardly extending central tubular neck adapted to be inserted through and compress the sealing means of another filter cartridge corresponding to said sealing means to form a fluid tight seal therewith.

3. The filter cartridge of claim 2 wherein said neck is closed by a cap having an annular axial flange provided with an inwardly open annular recess, and annular elastic sealing means arranged in said recess and compressed by said neck to form a fluid tight seal therewith.

4. A filter assembly including, in combination, a housing having an inlet for fluid to be filtered and an outlet for discharging filtered fluid from said housing; and at least one filter cartridge arranged in said housing, wherein the improvement comprises: said cartridge including an annular filter element; one end cap closing one end of said element; another annular end cap closing the other end of said element and having an axially inwardly offset inner peripheral portion, a substantially flat retaining ring forming with said inner peripheral portion an inwardly open channel, and annular elastic sealing means arranged in said channel; said one end cap being closed to one of said inlet and outlet; and the other of said inlet and outlet including a tubular extension projecting axially inwardly through and compressing said sealing means to form a fluid tight seal therewith.

5. The filter assembly of claim 4 wherein said one end cap has an axially outwardly extending central tubular neck closed by a cap having an annular axial flange provided with an inwardly open annular recess, and annular elastic sealing means arranged in said recess and compressed by said neck to form a fluid tight seal therewith.

6. A filter assembly including, in combination, a housing having an inlet for fluid to be filtered and an outlet for discharging filtered fluid from said housing; and at least two filter cartridges arranged in stacked relationship in said housing, wherein the improvement comprises: each of said cartridges including an annular filter element; one end cap closing one end of said element; another annular end cap closing the other end of said element and having an axially inwardly offset inner peripheral portion, a substantially flat retaining ring forming with said inner peripheral portion an inwardly open annular channel, and annular elastic sealing means arranged in said channel; said one end cap of one of said cartridges having an axially outwardly extending central tubular neck inserted through and compressing said sealing means of the other of said cartridges to form a fluid tight seal therewith; said one end cap of said other cartridge being closed to one of said inlet and outlet; and the other of said inlet and outlet including a tubular extension projecting axially inwardly through and compressing said sealing means of said one cartridge to form a fluid tight seal therewith.

7. The filter assembly of claim 6 wherein said one end cap of each of said cartridges has said neck, with said neck of said one end cap of said other cartridge being closed by a cap having an annular axial flange provided with an inwardly open annular recess, and annular elastic sealing means arranged in said recess and compressed by said neck of said one end cap of said other cartridge to form a fluid tight seal therewith.

* * * * *